(12) United States Patent
Simony

(10) Patent No.: US 6,664,530 B2
(45) Date of Patent: Dec. 16, 2003

(54) LOW-NOISE CMOS ACTIVE PIXEL HAVING CONTROL SIGNALS ACTIVE/INACTIVE DURING A RESET PHASE

(75) Inventor: Laurent Simony, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/156,710

(22) Filed: May 28, 2002

(65) Prior Publication Data

US 2003/0034434 A1 Feb. 20, 2003

(30) Foreign Application Priority Data

May 28, 2001 (FR) .............................. 01 07349

(51) Int. Cl.[7] .............................................. H01L 27/00
(52) U.S. Cl. ................................. 250/208.1; 250/214 R
(58) Field of Search ......................... 250/208.1, 214 R, 250/214 A, 214 LA; 257/290, 291–293, 440, 443; 348/302–311

(56) References Cited

U.S. PATENT DOCUMENTS 5,739,562 A * 4/1998 Ackland et al. ............ 257/291

FOREIGN PATENT DOCUMENTS

WO        WO 01/22727        3/2001

OTHER PUBLICATIONS

French Preliminary Search Report dated Dec. 3, 2001 for French Appln. No. 0107349.

* cited by examiner

Primary Examiner—Que T. Le
(74) Attorney, Agent, or Firm—Lisa K. Jorgenson; Jon A. Gibbons; Fleit, Kain, Gibbons, Gutman, Bongini & Bianco P.L.

(57) ABSTRACT

A CMOS active pixel for image sensors has a photosensitive element, a capacitive feedback element with a capacitance $C_F$, and four transistors, namely a first transistor, two reset transistors and a transistor for the selection of the pixel. These transistors are laid out and controlled in such a way that the first transistor is mounted as an amplifier during the pixel reset phase and as a follower during the read phase.

17 Claims, 3 Drawing Sheets

LOW-NOISE CMOS ACTIVE PIXEL HAVING CONTROL SIGNALS ACTIVE/INACTIVE DURING A RESET PHASE

CROSS REFERENCE TO RELATED APPLICATIONS

This application is based upon and claims priority from prior French Patent Application No. 0107349, filed May 28, 2001, the disclosure of which is hereby incorporated by reference in its entirety.

BACKGROUND OF THE INVENTION

1. Field of the Invention

The present invention generally relates to the field of image sensors with CMOS active pixels and more particularly to a low-noise CMOS active pixel.

2. Description of Related Art

At present, the main limitation of image sensors with CMOS active pixels lies in the presence of a reset noise in the electrical signals produced by the pixels of the sensor. This reset noise is troublesome because it is preponderant over the other noises in the signal-acquisition analog chain.

A classic CMOS active pixel essentially comprises a photosensitive element, such as a photodiode, associated with three transistors, a selection transistor to select the pixel, a transistor to reset the electrical charge of the photosensitive element and a read transistor to deliver a signal representing the electrical charge of the photodiode before and after the resetting of the pixel. The structure of a CMOS active pixel of this kind is shown in FIG. 1. The photosensitive element, referenced PD, is represented by its capacitance Cp. A reset transistor MR is connected between a power supply terminals VDD and the photosensitive element. This transistor is connected to the photosensitive element at a point known as a photosensitive node. This photosensitive node is furthermore connected to a gate of a read transistor MD. The drain of the transistor MD is connected to the power supply terminal VDD and its source is connected to the drain of a selection transistor MS. Finally, the drain of the transistor MS is connected to an output terminal S of the pixel. To select this pixel, a signal SEL is applied to the gate of the transistor MS.

A CMOS active pixel of this kind works as follows: during a reset phase (when the RESET signal is active), the potential of the photosensitive element is reset at a fixed value V0. Then, under the effect of a light signal, the electrical charge of the photosensitive element is modified, and the voltage at its terminals then goes from V0 to V0+Vsignal, Vsignal representing the number of incident photons received by the pixel. A method known as the CDS (Correlated Double Sampling) method is then used to read the value Vsignal. In this method, the signal is read at the output of the pixel before and after the resetting of the pixel and then the difference between the two signals is computed to deduce Vsignal therefrom.

A first drawback of this pixel structure is that the reset phase gives rise to a reset noise in the photosensitive element. This noise is higher as the capacitance of the photodiode is low. The root-mean-square value of this noise is given by the following formula:

$$B = \sqrt{\frac{kT}{C_P}}$$

where k is the Boltzmann constant, T is the absolute temperature and $C_P$ is the capacitance of the photodiode. With a capacitance $C_P$ of 3 femtofarads, the root-mean-square value of the noise is 1.2 mV at a temperature of 300 Kelvin. Accordingly, a need exists to reduce this reset noise.

With this type of CMOS active pixel, there is, furthermore, direct coupling between the voltage power supply source VDD and the photosensitive node by means of the drain-gate capacitance of the read transistor. A power supply noise then gets added to the reset noise in the photodiode.

Accordingly, a further need exists to reduce the power supply noise given to the photodiode, namely to improve the power supply rejection ratio of the pixel.

Furthermore, the use of a MOS transistor as a switch to reset the pixel produces an injection of electrical charges into the photodiode: after the transistor passes into its off state, a portion of the electrical charges forming the channel of the MOS transistor is located in the capacitance of the diode. The variation in voltage resulting from this is especially high as the capacitance of the photodiode is low. This phenomenon further reduces the voltage swing of the output signal which is already limited by the generally low value of the power supply voltage and will be increasingly limited, given the current progress of technologies in this field. Accordingly, yet another need exists to reduce this phenomenon of the injection of electrical charges into the photodiode.

Yet still another problem is lag. Lag appears when the reset phase is unable to totally erase the information acquired in the photodiode during the previous reading phase. Lag is expressed on the screen by a persistence of the image: the image read contains a residue of the previous image. This problem appears when a limited bandwidth reset technique is used. Accordingly, a need exists to overcome this problem of lag.

A known approach used to limiting reset noise is presented in Pain, Yang, Ortiz, Wrigley, Hancock and Cunningham, "Analysis And Enhancement Of Low-Light-Level Performance Of Photodiode-Type CMOS Active Pixel Imagers Operated With Sub-Threshold Reset", IEEE Workshop on CCDs and AIS, Nagano (Japan), pp 140–142, June 1999. The technique presented in this document, known as the "Hard Then Soft Reset" technique, consists of the use of a reset transistor working below its conduction threshold. The results presented in this document are useful in terms of power supply rejection, electrical charge injection, and the reduction of lag. However, this technique reduces reset noise only by a factor of two.

Another approach is presented in Fowler, Godfrey, Balicki and Canfield, "Low Noise Readout Using Active Reset For CMOS Aps" Proceedings of SPIE, vol. 3965, pp 126–135, 2000. According to the technique presented by Fowler et al., the photodiode is reset by using an amplifier to obtain a negative feedback of the reset noise. This technique is very valuable but has many drawbacks. In particular, it entails a large number of transistors (six transistors) per pixel, the need for a high power supply voltage because there are several cascade-mounted transistors, the need for a noise-free voltage ramp, and a mode of implementation which is difficult to render compatible with a matrix of pixels. Accordingly, a need exists to overcome this problem as well.

SUMMARY OF THE INVENTION

The present invention provides to a low-noise CMOS active pixel for an image sensor comprising a photosensitive element, such as a photodiode, whose electrical charge is reset during a reset phase and read during a read phase. The photosensitive element is connected between a photosensitive node and the ground. The CMOS active pixel device further comprises:

- a first amplifier active during the reset phase, the first amplifier including:
  - an inverter input connected to the photosensitive node;
  - a non-inverter input connected to a first reference voltage source; and
  - an output;
- a first switch and second switch connected in series, the first switch and the second switch connected between the inverter input and the output of the first amplifier, wherein the first switch is controlled by a first control signal and the second switch is controlled by a second control signal;
  - wherein the first control signal is active during a first time period of the reset phase;
  - wherein the second control signal is active during the first time period and a second time period of the reset phase;
  - wherein the first control signal and the second control signals are inactive during a third time period of the reset phase and during the read phase;
- a capacitive feedback element parallel-mounted on the first switch; and a second amplifier mounted as a follower with an input connected to the photosensitive node and an output providing a signal representing an electrical charge of the photosensitive element during the read phase, and the second amplifier active during the read phase.

According to a preferred embodiment, the first and second amplifiers are formed by a first transistor whose gate is connected to the photosensitive node and whose source is connected to the reference voltage source during the reset phase and to a first current source during the read phase, and a selection transistor controlled by a selection signal that is active during the reset and read phases of the pixel, having its source connected to the drain of the first transistor and its drain connected to a second current source during the reset phase and to a second reference voltage source during the read phase. During the read phase, the source of the first transistor delivers a signal representing the electrical charge of the photosensitive element.

The present invention provides a method for the resetting of a CMOS active pixel comprising at least one photosensitive element with a capacitance $C_P$ having a photosensitive node, an amplifier having an inverter input connected to the photosensitive node, a non-inverter input and an output, first and second switches and a capacitive feedback element, having a capacitance $C_F$, parallel-connected to the first switch. The method comprises the following:

- applying a reference voltage, during a first time period, to a non-inverter input of the amplifier and connecting the output of the amplifier to the inverter input of the amplifier using the first switch and the second switch;
- connecting the output of the amplifier, during a second time period, to the inverter input of the amplifier input by means of the capacitive feedback element and the second switch until a state of equilibrium is attained; and
- opening the first switch and the second switch during a third time period.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be apparent from the following detailed description taken in conjunction with the accompanying drawings.

DETAILED DESCRIPTION OF AN EMBODIMENT

Figure 1:
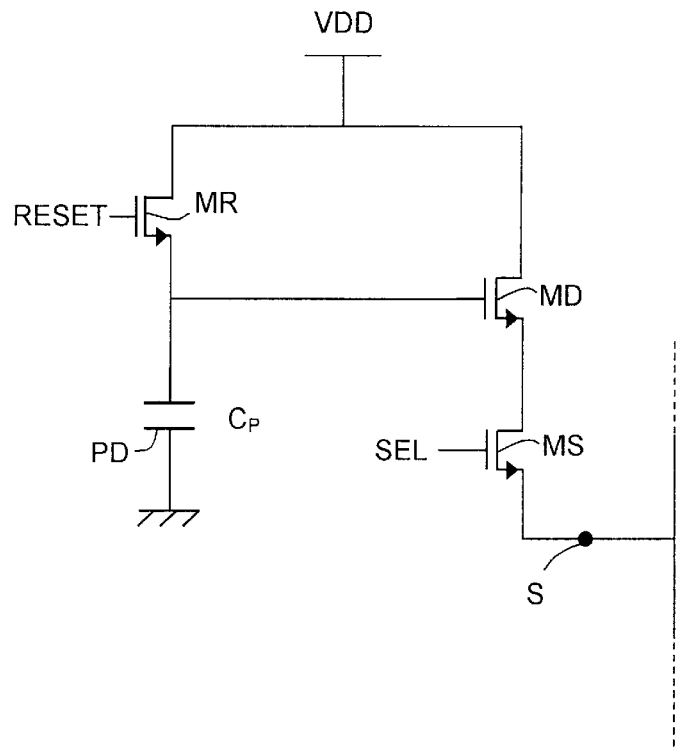
FIG. 1, which has already been described, illustrates a classic three-transistor CMOS active pixel.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Figure 2:
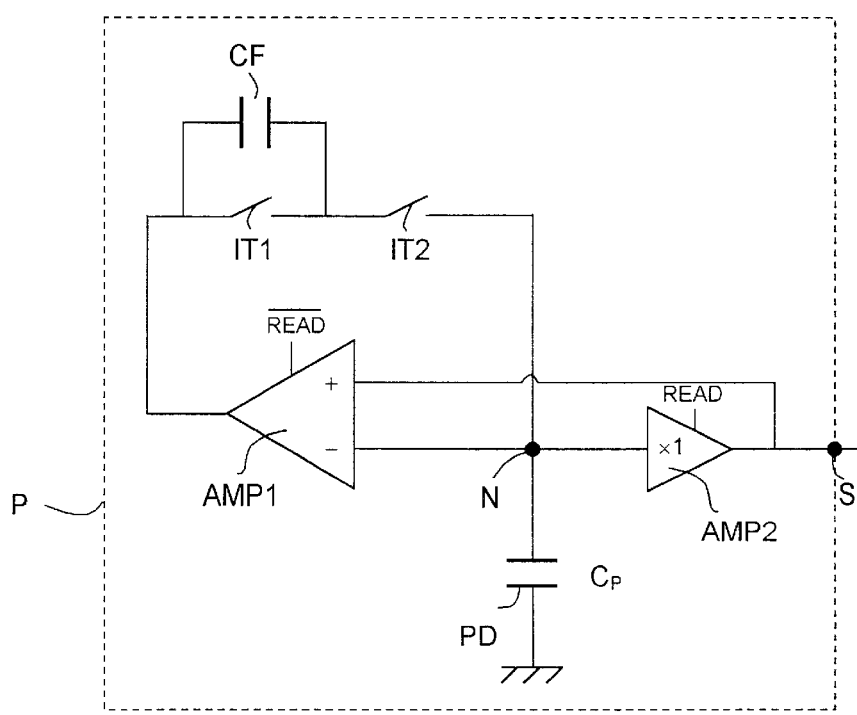
FIG. 2 is a drawing of a CMOS active pixel according to the invention.

The general structure of a CMOS active pixel according to the invention is shown in FIG. 2. The CMOS active pixel, referenced P in this FIG., comprises a photodiode PD with a capacitance $C_P$, an amplifier AMP1 that is active during the reset phase (the signal READ being inactive,) a follower amplifier AMP2 active during the READ phase (with the signal READ active), two switches IT1 and IT2 series-connected between the output and the inverter input of the amplifier AMP1, and a capacitive element CF having a capacitance $C_F$, parallel-connected with the switch IT1. The photodiode PD is connected between a photosensitive node N and the ground. The non-inverter input of the amplifier AMP1 is connected to an output terminal S of the pixel which receives a reference voltage during the pixel reset phase. The follower amplifier AMP2 which is active during the READ phase is furthermore connected between the photosensitive node and the output terminal S.

Figure 3:
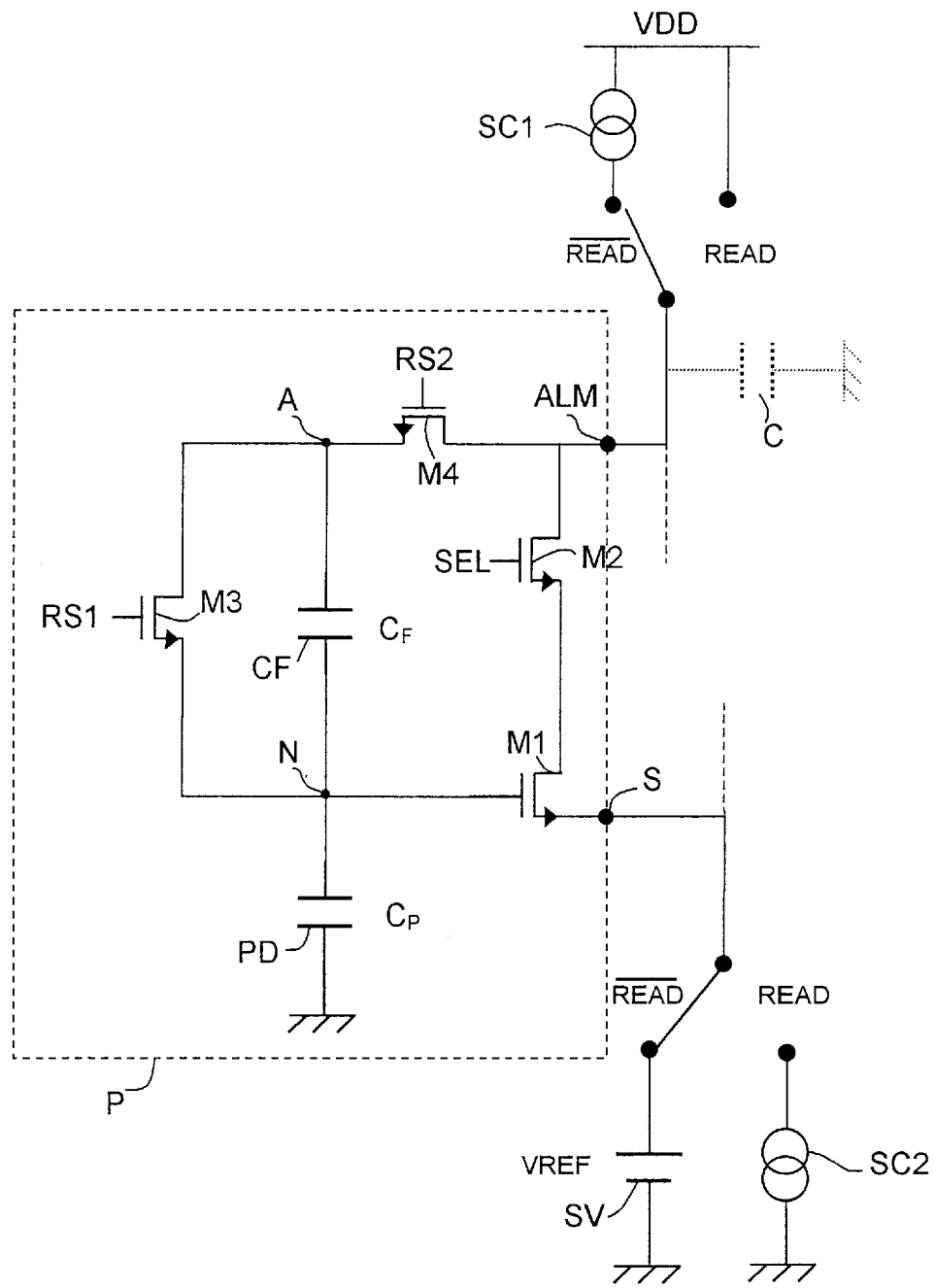
FIG. 3 is a detailed structural drawing of a CMOS active pixel according to the invention.

A more detailed structure of this CMOS active pixel is shown in FIG. 3. A transistor M1 and a row selection transistor M2 are used to form the amplifier AMP1 during the reset phase. These transistors are also used to form the follower amplifier AMP2 during the read phase. NMOS transistors M3 and M4 form the switches IT1 and IT2 of FIG. 2. The pixel reset phase is subdivided into three time periods $\phi_1$, $\phi_2$ and $\phi_3$ which will be described in detail further below in the description.

In a more detailed description of FIG. 3, it can be seen that the transistor M1 has its gate connected to the photosensitive node N and its source connected to the output terminal S of the pixel. The output terminal S delivers a signal representing the electrical charge of the photodiode during the pixel reading phase. The selection transistor M2 is cascode-mounted with the transistor M1, namely its source is connected to the drain of the transistor M1. Its drain is connected to a voltage and/or current power supply terminal ALM for the supply to the pixel and its gate receives a selection signal SEL to select the pixel. The transistor M3, forming the switch IT1, is connected between the photosensitive node N and a point A of the pixel. This transistor is controlled by a reset signal RS1 which is active during the time period $\phi_1$ of the pixel reset phase. The transistor M4 is connected between the voltage and/or current power supply terminal ALM and the point A. This transistor is controlled by a reset signal RS2 which is active during the time periods $\phi_1$ and $\phi_2$ of the reset phase. As indicated here above, the capacitive element CF is parallel-connected with the transistor M3. The value of its capacitance $C_F$ is low and is compatible with the dimensions of the pixel. Finally, a capacitor C representing the capacitance of the pixels of the column of the pixel considered is placed between the voltage and/or current power supply terminal ALM and the ground.

The image sensor containing the pixel has means provided to bias and power the pixel during the different phases of operation of the pixel. These means are advantageously common to all the pixels of one and the same column in the image sensor, and even to all the pixels of the image sensor as the case may be. A voltage source VDD and current source SC1 are therefore provided to power the voltage and/or current power supply terminal ALM for the pixel, respectively during the read phase and the reset phase of the pixel. Provision is also made for a second current source SC2 and a voltage source SV having negligible noise to impose a current during the read phase and a reference voltage VREF during the reset phase respectively on the output terminal S of the pixel.

Figure 4:
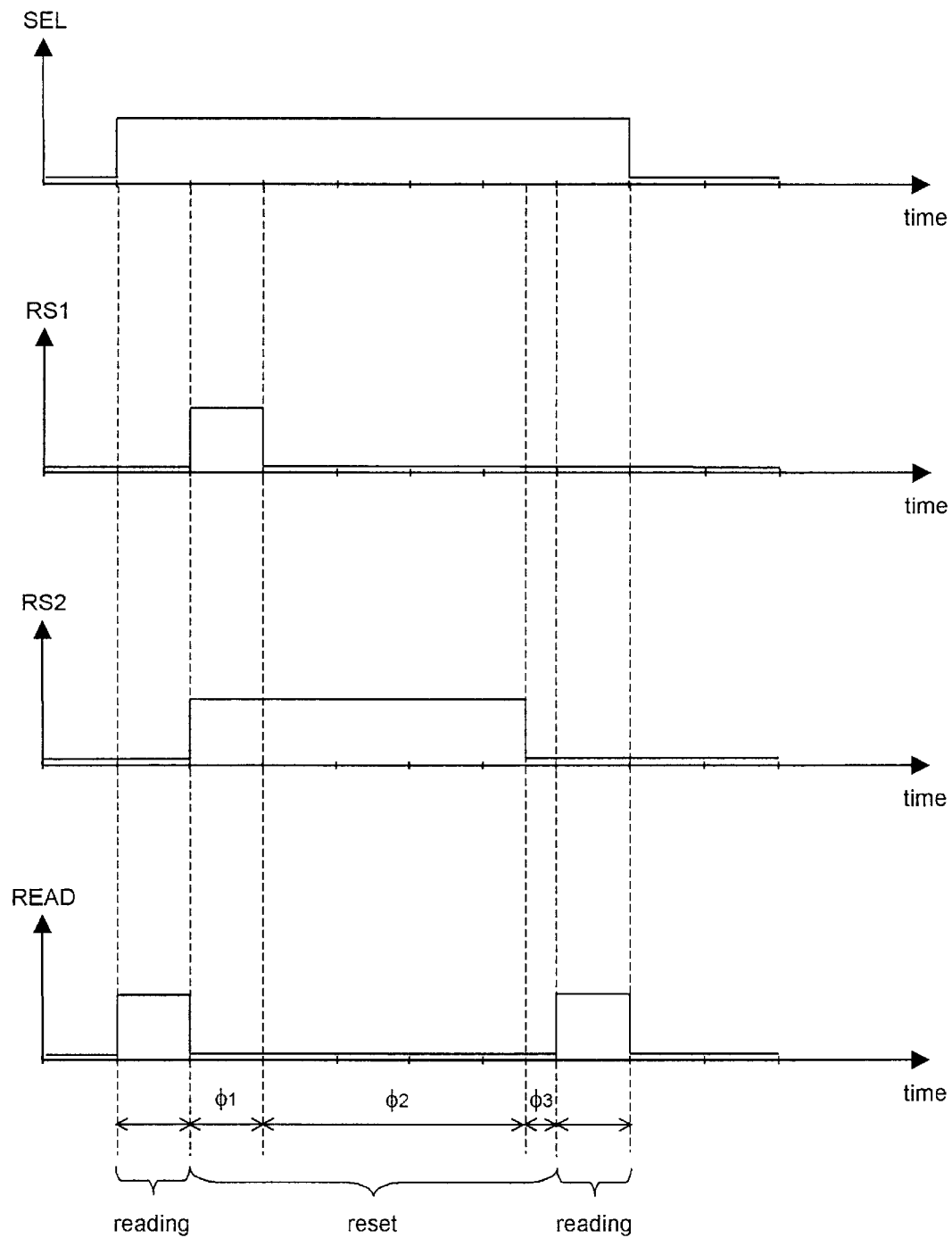
FIG. 4 is a timing diagrams of the control signals for the CMOS active pixel according to the invention.

The working of this CMOS active pixel is illustrated by the timing diagrams of the control signals SEL, RS1, RS2 and READ of FIG. 4. The reading of the information contained in the photodiode after modification of its electrical charge under the effect of a light signal requires a first reading phase to acquire a signal representing the illumination of the pixel by the light signal, a phase for resetting the electrical charge of the pixel and a second READ phase to acquire a signal representing the initial electrical charge of the pixel. The difference between these two signals gives a signal representing the variation of the electrical charge due to the incident photons of the light signal.

During the first and second phases for reading the pixel, the control signal READ and the selection signal SEL are active while the signals RS1 and RS2 are inactive. In the case of the N channel MOS transistors, a signal is the to be active if it has a high voltage level and it is the to be inactive if it has a low voltage level.

During the first reading phase, the terminal ALM is powered by the power supply voltage VDD and a current is imposed by the current source SC2 on the output terminal S of the pixel. The transistors M3 and M4 are off. The transistor M1, which is then mounted as a follower, is powered through the transistor M2. A voltage signal representing the electrical charge of the photodiode is then available at the output terminal S of the pixel.

As indicated here above, the reset phase that follows is sub-divided into three time periods $\phi_1$, $\phi_2$ and $\phi_3$. During these three time periods, the signal READ is inactive.

First Time Period ($\phi_1$)

During the time period $\phi_1$, the control signals SEL, RS1 and RS2 are active. The transistors M2, M3 and M4 are therefore conductive. The transistor M1 is mounted as an amplifier and its drain is looped to its gate through the transistor M2.

The pixel is powered by the current coming from the current source SC1 and the reference voltage VREF is imposed on the output terminal S of the pixel. The current given by the current source SC1 goes through the transistors M1 and M2 and is absorbed by the voltage source SV. A potential VREF+$V_{GS}$(M1) is imposed on the photosensitive node N, with $V_{GS}$(M1) representing the gate-source voltage of the transistor M1. This time period $\phi_1$ is aimed at erasing the information initially contained in the pixel in imposing a fixed voltage at the terminals of the photodiode.

Second Time Period Known as the Relaxation Period ($\phi_2$)

During the time period $\phi_2$, the control signal RS1 is inactive. The transistor M3 is then off. The noise voltage $$\sqrt{\frac{kT}{C_F}}$$

is sampled on the capacitive element CF. The transistor M1 is subjected to negative feedback by the capacitive divider formed by the capacitive element CF and the capacitance of the photodiode PD. The transistor M1 then works as an amplifier (amplifier AMP1). Since the transistors M1 and M2 are cascode-connected, a high static gain is obtained for the transistor M1.

The static gain of the transistor M1 is expressed in the following form:

$G_0 = gm_1 \times R_0$ where $gm_1$ is the transconductance of the transistor M1 and $R_0$ is its load impedance at the terminal ALM.

The gain of the loop formed by the transistors M1 and M2 and the capacitive divider is equal to:

$$G_b = G_0 \times \frac{C_F}{C_F + C_P} >> 1$$

The value of the loop gain $G_b$ remains high despite the capacitive divider.

Furthermore, the gain-bandwidth product, equal to $gm_1$/C, where C represents the load capacitance on the terminal ALM, is fixed by the choice of the current flowing through the transistor M1, namely the current given by the current source SC1.

During this time period $\phi_2$, the amplifier AMP1 finds a new state of equilibrium. This state is reached quickly, after a few tens of microseconds, owing to the high gain-bandwidth product. As a result of the high loop gain $G_b$, the reset noise $$\sqrt{\frac{kT}{C_F}}$$

sampled in negative feedback on the capacitive element is distributed as follows: a fraction $$\frac{1}{G_b + 1}$$

of this reset noise on the photodiode, and a fraction $$\frac{G_b}{G_b + 1}$$

of it on the drain of the transistor M2. The result thereof is that the noise, referenced B1, introduced by the capacitive element CF into the photodiode is highly attenuated by the loop gain. We then have:

$$B1 = \frac{\sqrt{\frac{kT}{C_F}}}{G_b+1} \approx \frac{\sqrt{kT}}{G_0} \times \frac{C_F + C_P}{C_F^{3/2}}$$

A noise B2 corresponding to a very wide band (about 10 GHz) is also produced by the transistor M4. This noise is not subjected to feedback by the amplifier because, beyond the gain-bandwidth product the amplifier AMP1 no longer has any gain (<<1) and therefore no longer works as an amplifier. Its spectral density is attenuated by the capacitive divider formed by the capacitive element CF and the capacitance of the photodiode. We have:

$$B2 = \frac{C_F}{C_F + C_P} \times \sqrt{\frac{kT(C_F + C_P)}{C_F C_P}} = \sqrt{\frac{kT}{C_P}} \times \sqrt{\frac{C_F}{C_F + C_P}}$$

The usual noise produced by the photodiode $$\left(\sqrt{\frac{kT}{C_P}}\right)$$

therefore undergoes attenuation by the factor $$\sqrt{\frac{C_F}{C_F + C_P}} << 1.$$

Third Time Period ($\phi_3$)

During the time period $\phi_3$, the control signal RS2 is inactive. The transistor M4 is therefore off. This passage to a low level must be done very rapidly as compared with the time constant of the amplifier AMP1. The noise B2 is then blocked in the photodiode. The total noise in the photodiode is then the quadratic sum of B1 and B2.

$$B_{total} = \sqrt{B1^2 + B2^2}$$

giving $$B_{total}^2 = kT\left[\frac{(C_P + C_F)^2}{G_0^2 C_F^3} + \frac{C_F}{C_P(C_F + C_P)}\right]$$

Thus, when the value of the capacitance of the capacitive element CF increases, the noise B1 falls while the noise B2 rises. It is therefore possible to define a value CF for which the total noise is minimal. In practice, the minimum value of the total noise is far smaller than the value of the usual reset noise, namely $$\sqrt{\frac{kT}{C_P}}.$$

The performance of this pixel with respect to electrical charge injection, power supply rejection and the problem of lag is as follows:

With respect to the injection of electrical charges into the photosensitive element, the falling edge of the control signal RS1 (start of $\phi_2$) prompts an injection of charges into the photodiode coming from the transistor M3. This injection is then corrected by the gain of the amplifier AMP1 during the rest of the time period $\phi_2$ (relaxation of the amplifier). The noise generated by the injection of electrical charges at the end of the time period $\phi_2$ is then equal to the initial noise (at the start of $\phi_2$) divided by (G+1) as in the case of the reset noise generated by the capacitive element CF. Thus, the injection of electrical charges is almost total at the drain of the selection transistor, thus preserving the photosensitive node. The falling edge of the control signal RS2 (the start of $\phi_3$) prompts an injection of charges into the photodiode coming from the transistor M4. A major fraction of these electrical charges is absorbed by the capacitance C present at the terminal ALM because the impedance of the capacitive element CF series-connected with the photodiode is far greater than that of the capacitance C. The remainder of the electrical charges is distributed between the capacitive element CF and the photodiode PD. A small part of this remainder is injected into the photodiode because $C_F >> C_P$. The result thereof is that the photosensitive node is protected against a major injection of electrical charges.

With respect to the power supply voltage rejection, the power supply noise is first of all filtered by the charge capacitance C present at the terminal ALM. Furthermore, the photodiode is uncoupled from the supply, firstly by the transistors M1 and M2 and, secondly, by the capacitive element. In the first case, if the selection signal SEL is filtered (which is possible since the transitions of the selection signal SEL may be slow), the drain of the transistor M1 is completely uncoupled from the supply and the photodiode too. In another case, the power supply noise is attenuated by the capacitive divider.

In the case of the lag mechanism, when the transistors M1, M2, M3 and M4 are conductive, a fixed voltage is imposed at low impedance on the photodiode. This fixed voltage is independent of the initial value contained in the pixel. The value of the time constant to reach this state is small: it is about 50 ns. The result of this is that, at the end of a period corresponding to the time constant multiplied a few times, the initial value of the pixel is totally erased.

Simulations have been carried out in order to detect the performance characteristics of the method of the invention in terms of noise. For these simulations, we have considered a photodiode with a capacitance CP=4 fF (femtoFarads). The static gain $G_0$ of the amplifier is equal to 1850 owing to the use of the cascode-mounted transistor M2. The following are the results of this simulation:

| $C_F$ | $\sqrt{\frac{kT}{C_F}}$ | $G_b = G_0 \times \frac{C_F}{C_F + C_P}$ | B1 | B2 | $B_{total} = \sqrt{B1^2 + B2^2}$ |
|---|---|---|---|---|---|
| 0.1fF | 6430 $\mu$V | 45 | 143 $\mu$V | 85 $\mu$V | 166 $\mu$V |
| 0.2fF | 4550 $\mu$V | 88 | 52 $\mu$V | 96 $\mu$V | 109 $\mu$V |
| 0.3fF | 3710 $\mu$V | 129 | 29 $\mu$V | 108 $\mu$V | 112 $\mu$V |
| 0.4fF | 3220 $\mu$V | 168 | 19 $\mu$V | 120 $\mu$V | 121 $\mu$V |
| 0.5fF | 2877 $\mu$V | 205 | 14 $\mu$V | 132 $\mu$V | 133 $\mu$V |

A minimum reset noise is obtained when the capacitance $C_F$ is equal to 0.2 fF. The reset noise is then equal to 109 $\mu$V. This value must be compared with that of the reset noise $$\left(\sqrt{\frac{kT}{C_P}}\right)$$

in a classic CMOS active pixel. This noise is equal to 1017 $\mu$V when Cp=4 fF. The reset noise is then reduced by a factor of 9.3 giving 19.4 dB.

In practice, this improves the resolution of the signals. The main consequence is a significant improvement of the quality of the images under low illumination.

In terms of power supply rejection, the simulations also show that the power supply rejection rate (in the cases $C_F$=0.2 fF; $C_F$=0.3 fF; $C_F$=0.4 fF) is always greater than 58 dB up to 100 MHz and never falls below 50 dB (at 1 GHz). This greatly reduces the constraints imposed on the power supply devices of the CMOS images.

Finally, the simulations also show an absence of lag and a very low injection of charges into the photodiode.

More generally, the reset method described here above may be applied to any CMOS active pixel comprising at least one photosensitive element with a capacitance $C_P$ having a photosensitive node, an amplifier having an inverter input connected to the photosensitive node, a non-inverter input and an output, first and second switches and a capacitive feedback element having a capacitance $C_F$ parallel-mounted on the first switch.

The method then comprises the following steps:
applying, during a first period $\phi_1$, a reference voltage VREF to the non-inverter input of the amplifier and connecting the output of the amplifier to its inverter input by means of the first and second switches;
connecting, during a second time period called a relaxation period $\phi_2$, the output of the amplifier to its inverter input by means of the feedback capacitive element and the second switch until a state of equilibrium is reached; and
opening, during a third time period $\phi_3$, the first and second switches.

It must be noted that the CMOS active pixel structure shown in FIG. 3 has an additional advantage that is not negligible. It is not necessary to resort to a double reading of the pixel to read the information contained in the photodiode. Indeed, the photodiode is reset by a reference voltage VREF applied to the source of the transistor M1. The gate-source voltage of the transistor M1 which has a random offset (variable from pixel to pixel) is stored in the photodiode (on the gate side of the transistor M1). Consequently, when the transistor is mounted as a follower, this random offset is no longer present at the source of the transistor M1. The double reading of the pixel is therefore no longer necessary.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A CMOS active pixel for an image sensor including a photosensitive element, whose electrical charge is reset during a reset phase and read during a read phase, the photosensitive element being connected between a photosensitive node and a ground, the active pixel comprising:
   a first amplifier active during a reset phase, the first amplifier including:
      an inverter input connected to a photosensitive node;
      a non-inverter input connected to a first reference voltage source; and
      an output;
   a first switch and second switch connected in series, the first switch and the second switch connected between the inverter input and the output of the first amplifier, wherein the first switch is controlled by a first control signal and the second switch is controlled by a second control signal;
      wherein the first control signal is active during a first time period of the reset phase;
      wherein the second control signal is active during the first time period and a second time period of the reset phase;
      wherein the first control signal and the second control signals are inactive during a third time period of the reset phase and during the read phase;
   a capacitive feedback element parallel-mounted on the first switch; and
   a second amplifier mounted as a follower with an input connected to the photosensitive node and an output providing a signal representing an electrical charge of the photosensitive element during the read phase, and the second amplifier active during the read phase.

2. The CMOS active pixel of claim 1, wherein the photosensitive element is a photo diode.

3. The CMOS active pixel of claim 2, wherein the first amplifier and the second amplifier comprises:
   a first transistor having a gate connected to the photosensitive node, a source connected to a first reference voltage source during the reset phase and to a first current source during the read phase, and a drain; and
   a selection transistor controlled by a selection signal that is active during the reset phase and the read phase, the selection transistor with a gate receiving the selection signal, a source connected to a drain of a first transistor, and a drain connected to a second current source during the reset phase and to a second reference voltage source during the read phase, a source of the first transistor delivering the signal representing the electrical charge of the photosensitive element during the read phase.

4. The CMOS active pixel of claim 1, wherein the capacitive feedback element has a capacitance $C_F$ and wherein the photosensitive element has a capacitance $C_P$ and the ratio $C_F/C_P$ is less than 1.

5. The CMOS active pixel of claim 4, wherein a gain of the first amplifier is such that the product of this gain by the ratio $C_F/(C_F+C_P)$ is greater than 10.

6. The CMOS active pixel of claim 3, wherein the capacitive feedback element has a capacitance $C_F$ and wherein the photosensitive element has a capacitance $C_P$ and the ratio $C_F/C_P$ is less than 1.

7. The CMOS active pixel of claim 6, wherein a gain of the first amplifier is such that the product of this gain by the ratio $C_F/(C_F+C_P)$ is greater than 10.

8. The CMOS active pixel of claim 3, wherein the photosensitive element is a photodiode.

9. The CMOS active pixel of claim 4, wherein the photosensitive element is a photo diode.

10. The CMOS active pixel of claim 5, wherein the photosensitive element is a photodiode.

11. The CMOS active pixel of claim 6, wherein the photosensitive element is a photodiode.

12. The CMOS active pixel of claim 7, wherein the photosensitive element is a photo diode.

13. An image sensor with a least one CMOS active pixel comprising:
   a first amplifier active during a reset phase, the first amplifier including:
      an inverter input connected to a photosensitive node;
      a non-inverter input connected to a first reference voltage source; and
      an output;
   a first switch and second switch connected in series, the first switch and the second switch connected between the inverter input and the output of the first amplifier, wherein the first switch is controlled by a first control signal and the second switch is controlled by a second control signal;
      wherein the first control signal is active during a first time period of the reset phase;
      wherein the second control signal is active during the first time period and a second time period of the reset phase;
      wherein the first control signal and the second control signals are inactive during a third time period of the reset phase and during a read phase;
   a capacitive feedback element parallel-mounted on the first switch; and
   a second amplifier mounted as a follower with an input connected to the photosensitive node and an output providing a signal representing an electrical charge of the photosensitive element during the read phase, and the second amplifier active during the read phase.

14. A method for the resetting of a CMOS active pixel comprising at least one photosensitive element having a photosensitive node, an amplifier having an inverter input connected to the photosensitive node, a non-inverter input and an output, a first switch and a second switch and a capacitive feedback element parallel-connected to the first switch, wherein the method comprises:
   applying a reference voltage, during a first time period, to a non-inverter input of an amplifier and connecting an output of the amplifier to an inverter input of the amplifier using a first switch and a second switch;
   connecting an output of the amplifier, during a second time period, to the inverter input of the amplifier input by means of a capacitive feedback element and a second switch until a state of equilibrium is attained; and
   opening the first switch and the second switch during a third time period.

15. The method for resetting of a CMOS active pixel of claim 14, wherein in the connecting an output of the amplifier, during a second time period includes connecting the output of the amplifier during a relaxation period.

16. The method for the resetting of a CMOS active pixel of claim 14, wherein the least one photosensitive element has a capacitance $C_P$, and the capacitive feedback element, has a capacitance $C_F$ and the ratio $C_F/C_P$ is less than 1.

17. The method for the resetting of a CMOS active pixel of claim 16, wherein a gain of the amplifier is such that the product of this gain by the ratio $C_F/(C_F+C_P)$ is greater than 10.

* * * * *